(12) United States Patent
Dold

(10) Patent No.: US 11,938,661 B2
(45) Date of Patent: Mar. 26, 2024

(54) DEVICE FOR INJECTION MOLDING A MOLDED PART HAVING AN INSERT

(71) Applicant: IMS GEAR SE & Co. KGaA, Donaueschingen (DE)

(72) Inventor: Michael Dold, Bräunlingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 17/994,219

(22) Filed: Nov. 25, 2022

(65) Prior Publication Data
US 2023/0166433 A1 Jun. 1, 2023

(30) Foreign Application Priority Data

Nov. 29, 2021 (EP) ..................................... 21210970

(51) Int. Cl.
B29C 45/14 (2006.01)

(52) U.S. Cl.
CPC .. B29C 45/14008 (2013.01); B29C 45/14065 (2013.01)

(58) Field of Classification Search
CPC ........ B29C 45/14008; B29C 45/14032; B29C 45/14065
USPC ........................................................ 425/126.1
See application file for complete search history.

(56) References Cited

U.S. PATENT DOCUMENTS 4,334,846 A * 6/1982 Boniface ........... B29C 45/14032
425/126.1
4,443,173 A * 4/1984 Mansberger ...... B29C 45/14032
425/126.1

FOREIGN PATENT DOCUMENTS

| CN | 107775892 A | * | 3/2018 | ....... B29C 45/14008 |
|---|---|---|---|---|
| CN | 108284563 A | * | 7/2018 | ............. B29C 45/14 |
| DE | 3135259 A1 | | 3/1983 | |
| JP | S5168665 A | | 6/1976 | |
| JP | 53072066 A | * | 6/1978 | ....... B29C 45/14008 |
| JP | S6064816 A | | 4/1985 | |
| JP | S60109813 A | | 6/1985 | |
| JP | 63004921 A | * | 1/1988 | ....... B29C 45/14008 |

OTHER PUBLICATIONS

Mechanical translation of CN 107775892 A dated Mar. 2018. (Year: 2018).*

(Continued)

*Primary Examiner* — Robert B Davis
(74) *Attorney, Agent, or Firm* — Nath, Goldberg & Meyer; Jerald L. Meyer

(57) ABSTRACT

A device for injection molding a molded part having an insert includes a mold having a mold cavity, an insert loading device having an insert push rod for positioning an insert in the mold cavity, a magazine having inserts arranged side by side and aligned with the insert push rod, and an insert feed channel ending in the mold cavity and into which the insert aligned with the one insert push rod can be pushed out of the one magazine by means of the insert push rod. The magazine has a horizontally aligned insert receiving surface having adjacent placement positions for the inserts, the placement positions being adapted to the contour of the inserts. The magazine has a loading region having at least one freely accessible placement position for mechanically loading the same with an insert.

12 Claims, 8 Drawing Sheets

(56) References Cited

OTHER PUBLICATIONS

Mechanical translation of JP 53072066 A dated Jun. 1978. (Year: 1978).*
Search report dated May 24, 2022, for European application No. 21210970.6.

* cited by examiner

DEVICE FOR INJECTION MOLDING A MOLDED PART HAVING AN INSERT

The invention relates to a device for injection molding a molded part having an insert according to the preamble of claim 1.

Such a device is known from the generic DE 31 35 259 A1.

This device is an injection molding device having a mold consisting of two mold halves and having a mold cavity. Using this mold, a metal shaft is inserted into the mold cavity as an insert and overmolded with plastic for the production of plastic gears. This injection-molded part is ejected by means of an ejector when the mold is open, in that a cylindrical insert located between the mold cavity and the ejector in a coaxial arrangement with the already recast insert located in the mold cavity ejects the molded part by means of the feed movement of the ejector and at the same time the insert is inserted at the position of the ejected and recast insert in the mold cavity. This significantly shortens the duration of the two operations "ejecting the molded part" and "inserting the insert", since the movement of the ejector, mediated by the inserted insert, first results in the ejection of the finished injection-molded part and then the inserted insert itself is pushed into the mold cavity.

In this known device according to DE 31 35 259 A1, a plurality of inserts are held ready in a magazine feed channel extending perpendicularly or obliquely to the vertical. In this feed channel, the inserts are arranged one above the other in a row, axially parallel to the ejector, such that the inserts are moved under the effect of gravity toward an ejection station located at the lower end of the feed channel, in which station an insert is aligned with the ejector. To load the magazine with inserts, the magazine is connected to a separating apparatus via flexible lines.

In order to ensure reliable functioning of the known device according to DE 31 259 A1, it is proposed that the piston rod of a pneumatic working cylinder be associated with the upper end of the feed channel of the magazine, such that the piston rod in the working position exerts a feed pressure on the uppermost insert of the stack of rod-shaped inserts located in the feed channel of the magazine. This is to prevent the insert from becoming wedged in its path along the feed channel in unfavorable circumstances.

In the known device according to DE 31 35 259 A1, a plurality of mold cavities can be realized in the mold, and a magazine accommodating the inserts is required for each individual mold cavity.

A disadvantage of this known device according to DE 31 35 259 A1 is that, despite a piston rod acting on the uppermost insert in the feed channel of the magazine, an insert becoming jammed cannot be ruled out.

U.S. Pat. No. 4,443,173 A also describes a device for injection molding a molded part having an insert, in which a hopper flanged to a mold is randomly filled with inserts, with the end of the hopper merging into a plurality of channels in parallel, each of which ends in a mold cavity in the mold. The inserts each slide out of the hopper into a channel, and the supply of an insert into the respective mold cavity is controlled by a mechanism which in turn is activated when the two mold halves of the mold are closed.

In the case of this known device according to U.S. Pat. No. 4,443,173 A, jamming of the inserts when they fall into the channel associated with a particular mold cavity cannot be ruled out either.

It is therefore the object of the invention to provide a device of the type mentioned at the outset in which jamming of the inserts in the magazine is prevented with a high degree of certainty, but with a short overall process time for the injection-molded part.

This object is achieved by a device having the features of claim 1.

Such a device for injection molding a molded part having an insert comprises:
  a mold having two mold halves and having at least one mold cavity,
  an insert loading device having at least one insert push rod for positioning an insert in the at least one mold cavity,
  at least one magazine having inserts arranged side by side in a row, one insert being aligned with the at least one insert push rod, and
  an insert feed channel ending in the at least one mold cavity and into which the insert aligned with the at least one insert push rod can be pushed out of the at least one magazine by means of the insert push rod.
  According to the invention:
  the magazine has a horizontally aligned insert receiving surface having adjacent placement positions for the inserts, the placement positions having a placement contour adapted to the contour of the inserts,
  the magazine has a loading region having at least one freely accessible placement position for mechanically loading the same with an insert, and
  in order to position an insert in the placement position aligned with the insert push rod, the at least one insert placed in the loading region can be moved toward an adjacent insert by means of a pushing device, it being possible for each of the inserts on the insert receiving surface to be pushed successively into the adjacent placement position.

In this device according to the invention, an insert receiving surface of the magazine is mechanically loaded with the inserts into the placement positions provided for this purpose, the insert receiving surface being aligned horizontally with respect to the mold, thereby significantly reducing the risk of the inserts becoming jammed. In order to ensure that the individual inserts are securely positioned on the insert receiving surface and at the same time to allow each insert to be pushed further to the directly adjacent placement position when the placement position aligned with the insert push rod on the insert receiving surface has become free, the placement positions have a placement contour adapted to the contour of the inserts.

The horizontal alignment of the insert receiving surface allows a plurality of mold cavities to be arranged in the plane of the insert receiving surface. Thus, only a single magazine is required for a plurality of such mold cavities.

The successive further pushing of each of the individual inserts into the adjacent placement position is made possible in a functionally reliable manner in that the distance between adjacent placement positions is preferably such that the inserts placed in said adjacent placement positions are in abutment. In the case of a preferably cylindrical insert with a circular cross section, this means that the distance between the adjacent placement positions corresponds to the diameter of such an insert.

Due to its horizontal orientation, the insert receiving surface can be loaded quickly and easily by machine, e.g., using a robot, since the loading region of the magazine is freely accessible, i.e., the loading region protrudes, for example, beyond the mold and can therefore be reached without hindrance by a robot arm.

In order to prevent the inserts from being pushed over one another when they are each pushed further into the adjacent placement position, according to a further development:

the magazine is arranged in the stationary molded part,
the insert receiving surface of the magazine forms a magazine shaft together with a partition of the stationary molded part, and
the smallest distance between the insert receiving surface and the partition is a few $1/10$ mm, in particular $3/10$ mm to $5/10$ mm, larger than the extent of the insert perpendicular to the partition.

In the case of a cylindrical insert with a circular cross section, for example, this means that the smallest distance between the insert receiving surface and the partition is only a few $1/10$ mm larger than the diameter of such a cylindrical insert.

In a development of the invention, the insert receiving surface has an undulating surface structure of wave troughs and wave crests, the wave troughs being adapted to the contour of the inserts as a placement contour.

The undulating surface structure is adapted in such a way that the radius of the wave crest corresponds at most to the radius of the wave trough, i.e., the wave trough representing a depression is not too flat and thus the insert is prevented from rolling away.

A proposed alternative to the undulating surface structure consists in a sawtooth-shaped surface structure with gently rising and steeply sloping flanks, the inserts each being arranged on the insert receiving surface between a steeply sloping flank and a gently rising flank as a placement contour adapted to the contour of the inserts. Preferably, the angle of the gently rising flank of the sawtooth-shaped surface structure of the insert receiving surface is between 20° and 30°.

According to a further advantageous development of the invention:

the mold has at least one further mold cavity which is arranged in the plane of the insert receiving surface adjacent to the at least one mold cavity,
the insert loading device has at least one additional insert push rod for positioning an insert in the further mold cavity, and
an insert feed channel ending in the further mold cavity is provided, into which channel the insert aligned with the further insert push rod can be pushed out of the magazine by means of the insert push rod.

In this way, a plurality of mold cavities can be supplied simultaneously with an insert from a single magazine, with only the insert loading device having an additional insert push rod. In contrast, for the device known from the prior art according to DE 31 35 259 A1, a magazine is required for each mold cavity in the mold.

According to another advantageous embodiment, the mold has at least one further mold cavity which is arranged in a plane that is parallel to the plane of the insert receiving surface of the at least one magazine, and
in the parallel plane a further magazine according to the preceding claims is arranged in the mold.

If there is thus a plurality of rows of mold cavities arranged one above the other and in parallel in the mold, a magazine is required for each horizontally extending row. Each of these magazines has a freely accessible loading region that can be loaded with inserts by machine, for example by means of only a single robot.

According to a further development of the invention, the insert loading device is designed as an ejector device, the insert push rod being an ejector.

Therefore, after an insert has been pushed into a mold cavity by means of the insert push rod and an injection molding process has been completed, the injection-molded part is ejected from the mold by means of said insert push rod as an ejector when the mold is open.

As an alternative to the last-mentioned development, a removal means, preferably a removal robot, is provided, by means of which an injection-molded part can be removed from the mold when the mold is open.

The advantage of such a device is that damage to the molded parts due to falling is prevented. If a plurality of mold cavities are provided, the molded parts can be placed separately in nests by means of such a removal robot.

The invention is described in detail below using exemplary embodiments with reference to the accompanying figures, in which.

Figure 4:
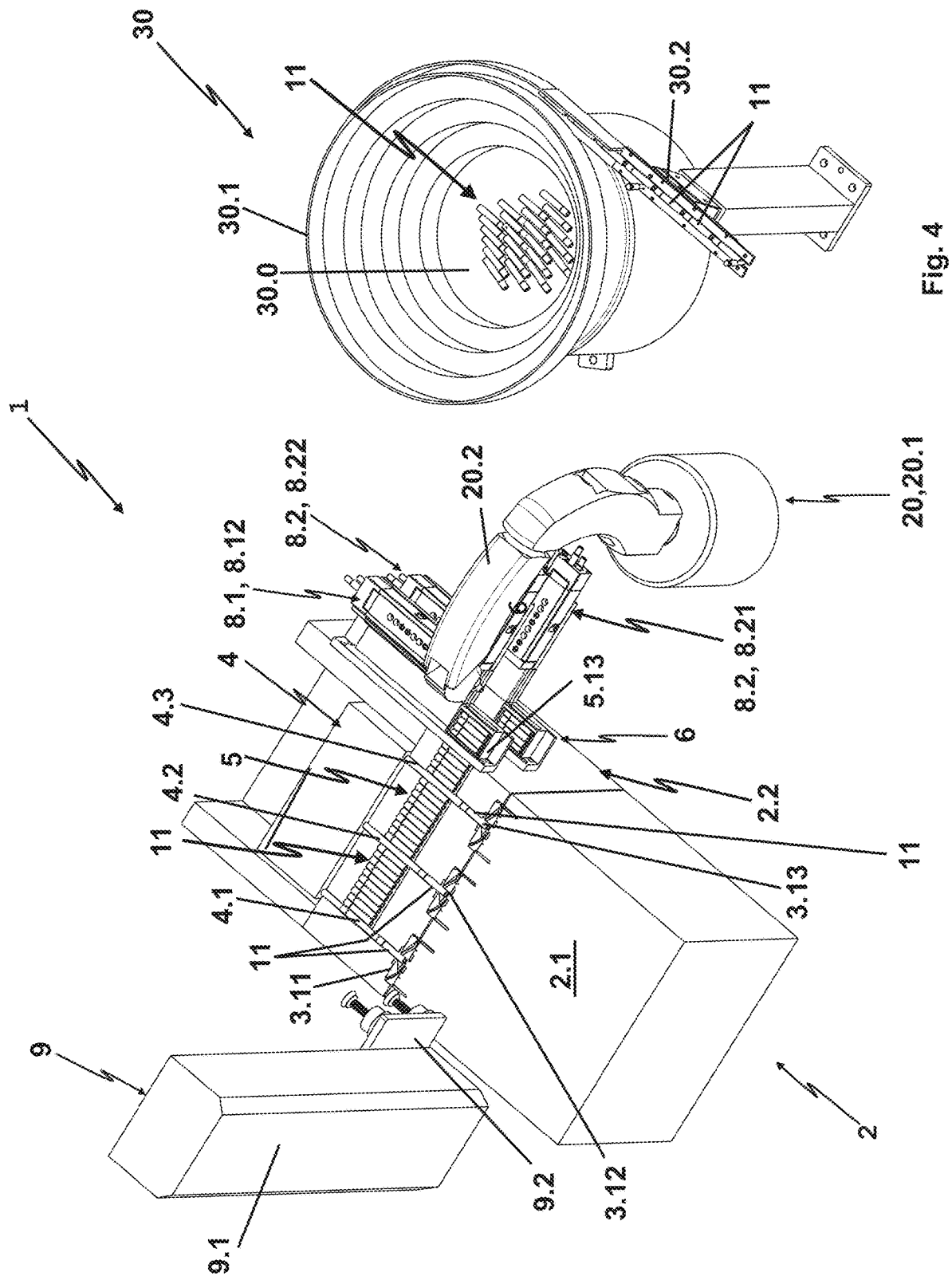
Figure 5:
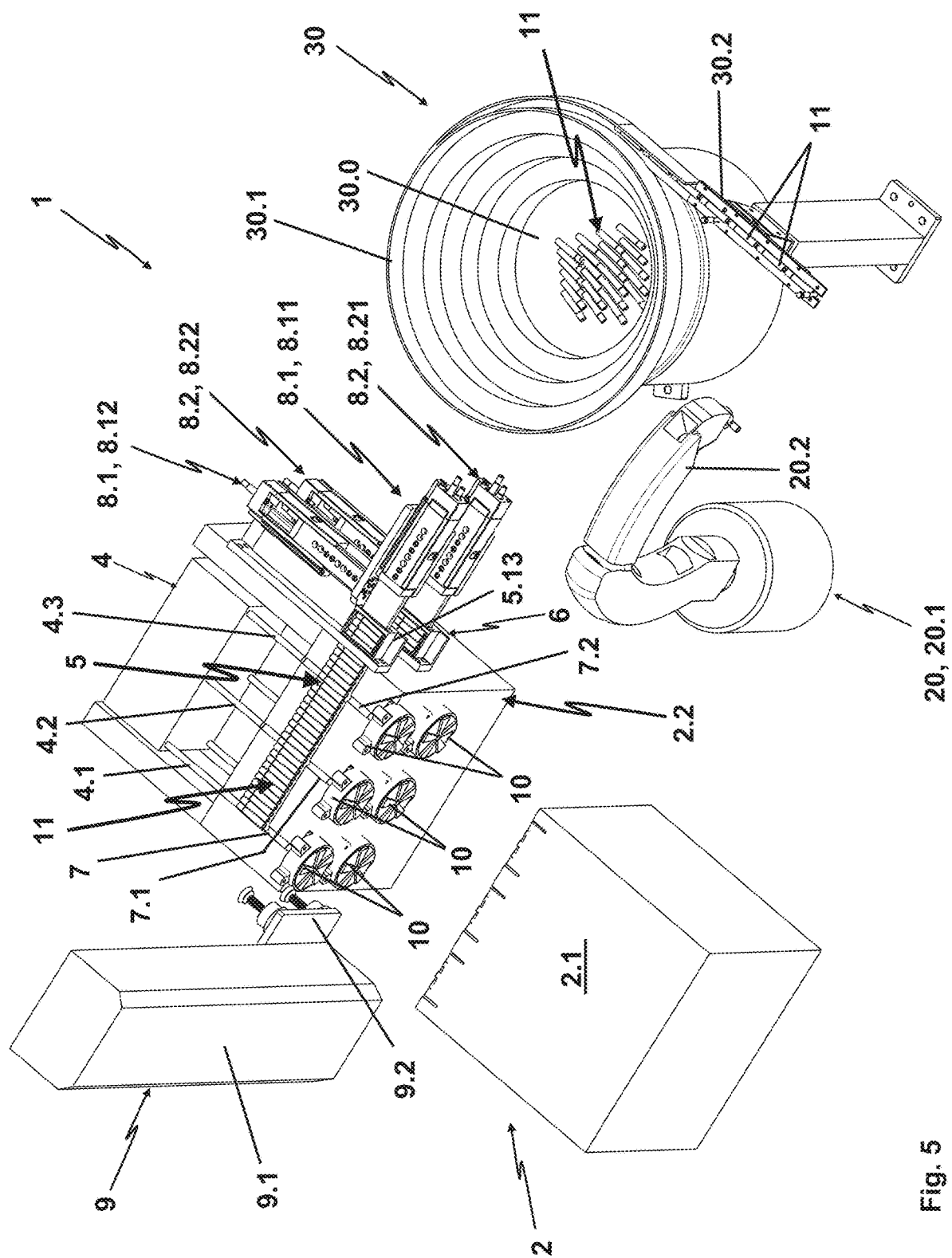

The device 1 according to FIGS. 1 to 5 for injection molding a molded part having a cylindrical insert 11 (cf. FIG. 5) comprises as a central component a mold 2 having two mold halves 2.1 and 2.2, a handling tool 20 designed as a feeding robot 20.1 which loads the mold 2 with inserts 11, a conveyor device 30 which provides the inserts 11 for the feeding robot 20.1, and a removal means 9 designed as a removal robot 9.1 which removes the injection-molded parts 10 from the open mold 2 (cf. FIG. 5).

The listed components of the device 1, namely the mold 2, the feeding robot 20.1, the conveyor device 30, and the removal robot 9.1 are located on a footprint corresponding to the x-y plane of the coordinate system shown in FIGS. 1 to 5.

The mold 2 has two rows of three mold cavities each (also called mold nests), namely a first horizontally extending row having mold cavities 3.11, 3.12, and 3.13 and a second row extending in parallel with and below the first row in relation to the vertical (z direction) and having mold cavities 3.21, 3.22, and 3.23. These mold cavities are designed as cylindrical cavities, with the insert 11 being aligned with the cylinder axis of the hollow space of a mold cavity.

Figure 1:
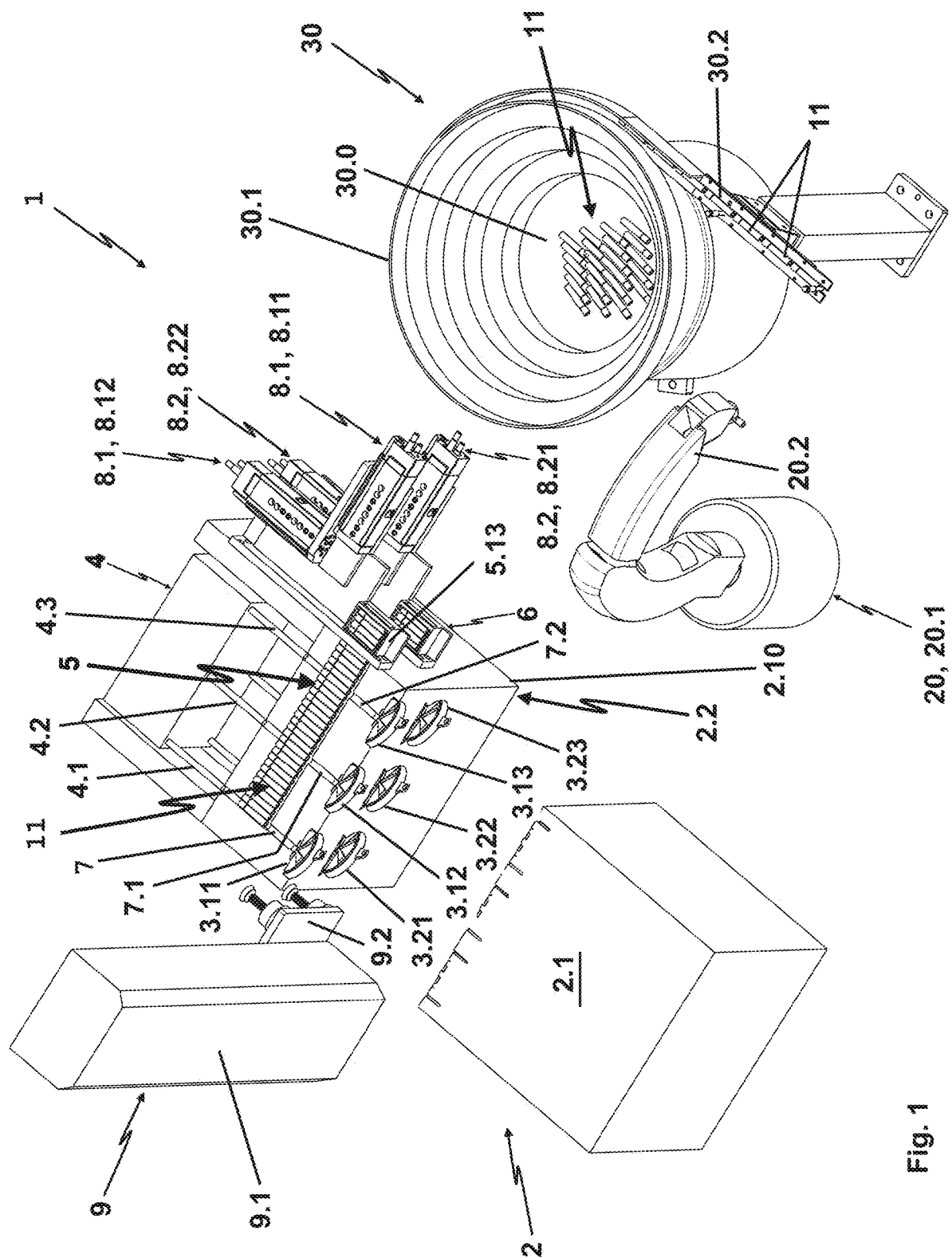
FIGS. 1, 2, 3, 4, 5 are perspective exploded views of a device having a mold according to a first embodiment of the invention in different process stages of a molded part.

The mold cavities 3.11, 3.12, 3.13, 3.21, 3.22, and 3.23 are substantially formed by the stationary mold half 2.2 of the mold 2 shown open in FIG. 1. The mold half 2.1 is the moving part of the mold 2.

Aligned with the cylinder axis of the hollow space of a mold cavity 3.11, 3.12, 3.13, 3.21, 3.22, and 3.23, a horizontally extending insert feed channel 7, 7.1, and 7.2 leads into a mold cavity, the insert feed channels for the mold cavities 3.21, 3.22, and 3.23 not being visible in FIGS. 1 to 5. The insert feed channels 7, 7.1, and 7.2 and the insert feed channels for the mold cavities 3.21, 3.22, and 3.23 end on the back of the mold half 2.2 of the mold 2 if the side of the form half 2.1 having mold cavities 3.11, 3.12, 3.13, 3.21, 3.22, and 3.23 is designated as the front.

The stationary mold half 2.2 has an insert loading device 4 which can be moved with the direction of the insert feed channels 7, 7.1, and 7.2 (hereinafter also including the insert feed channels of the mold cavities 3.21, 3.22, and 3.23), and which has an insert push rod 4.1, 4.2, and 4.3 for each insert feed channel 7, 7.1, and 7.2 and likewise an insert push rod (no reference sign in FIGS. 1 to 5) for each of the insert feed channels of the mold cavities 3.21, 3.22, and 3.23. The movement of the insert device 4 in they direction causes the insert push rods 4.1, 4.2, and 4.3 to extend into the insert feed channels 7, 7.1, and 7.2 in order to insert inserts 11 into the mold cavities 3.11, 3.12, and 3.13 and/or to eject the injection-molded parts 10 from the mold cavities 3.11, 3.12, and 3.13, as will be explained below (the same applies to the mold cavities 3.21, 3.22, and 3.23).

For feeding the inserts 10, the mold half 2.2 has a magazine 5 for the mold cavities 3.1, 3.12, and 3.13 of the first row in the plane of the insert feed channels 7, 7.1, and 7.2 and a further magazine 6 for the mold cavities 3.21, 3.22, and 3.23 in the plane of the insert feed channels of the mold cavities 3.21, 3.22, and 3.23, the magazines being loaded with a plurality of cylindrical inserts 11.

The advantage of the horizontally aligned magazines 5 and 6 is such that a magazine 5 or 6 can be used to load a plurality of adjacent mold cavities 3.11, 3.12, and 3.13 and 3.21, 3.22, and 3.23, respectively.

The magazine 5 or 6 has a rectangular contour with two long sides and two short sides in the x-y plane, the long sides being aligned perpendicularly to the direction of the insert feed channels 7, 7.1, and 7.2. The two magazines 5 and 6 protrude beyond the mold 2 at an end face 2.10 of the mold half 2.2. This part of the magazine 5, which protrudes beyond the end face 2.10, forms a loading region 5.13 into which the inserts 11 from the conveyor device 30 are placed by means of the feeding robot 20.1. The same applies to the further magazine 6.

When the magazine 5 is installed in the mold half 2.2, the inserts 11 are mounted in the magazine 5 in such a way that each insert 11 is aligned with an insert feed channel 7, 7.1, and 7.2. It is thus possible for each of the inserts 11 placed at these positions to be pushed into a corresponding mold cavity 3.11, 3.12, and 3.13 via a corresponding insert feed channel 7, 7.1, and 7.2 by means of the corresponding insert push rod 4.1, 4.2, and 4.3. The same applies to the further magazine 6.

Figure 6:
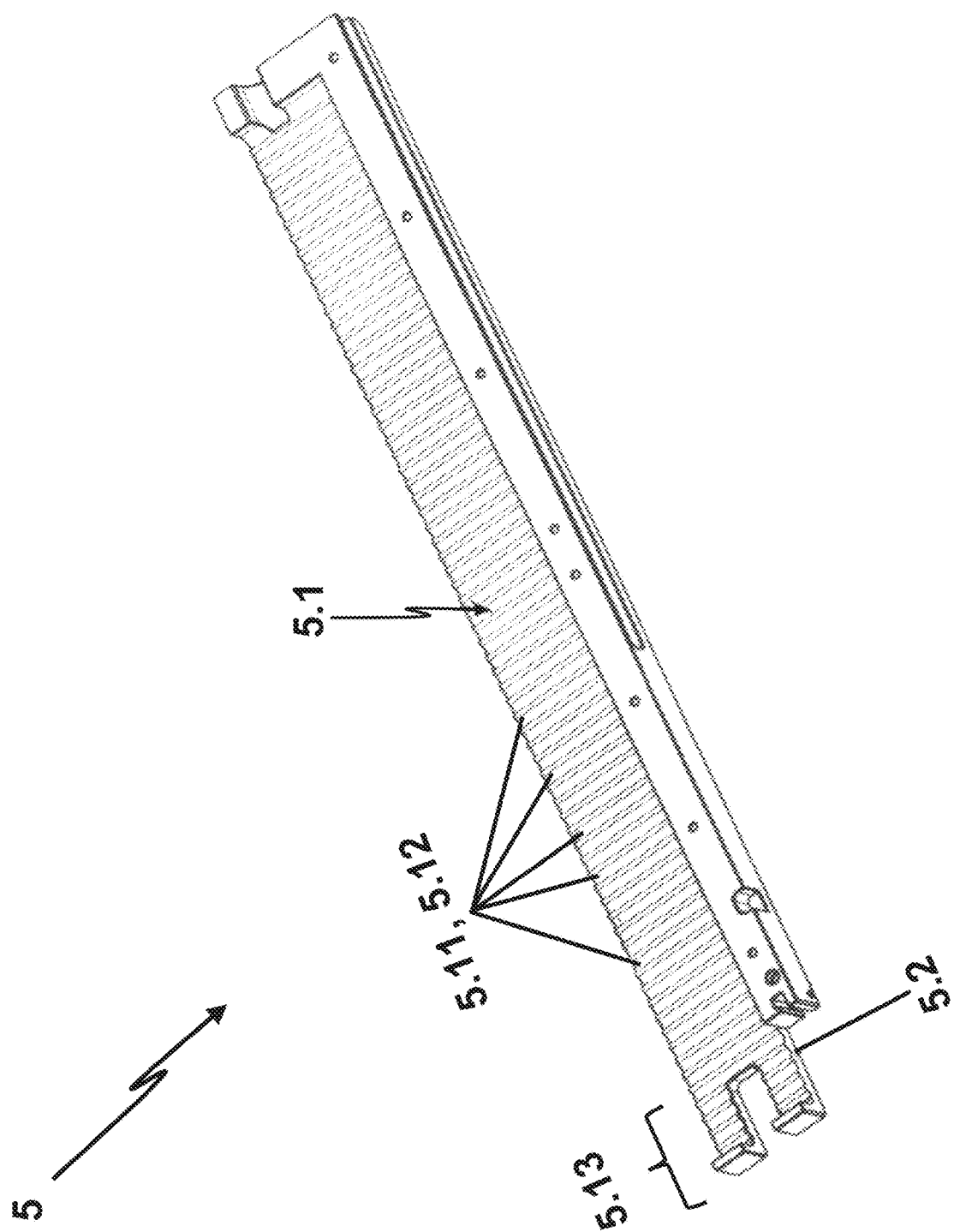
FIG. 6 is a perspective view of a magazine of the devices according to FIGS. 1 to 5.
Figure 7:
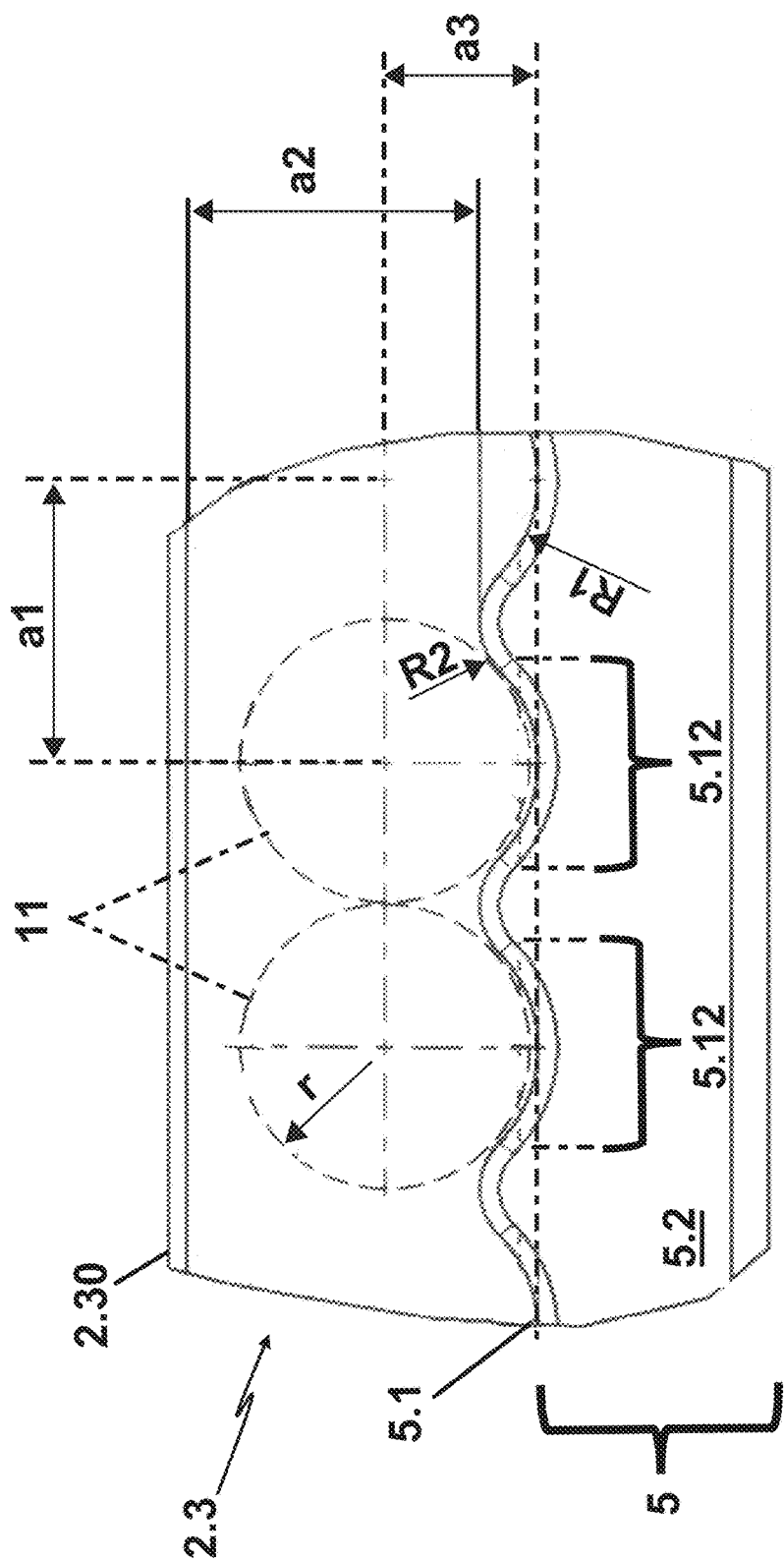
FIG. 7 is a partial sectional view of a magazine installed in a mold according to FIGS. 1 to 5.

The magazine 5 (the same applies to the further magazine 6) is shown in detail in FIG. 6 and in the state in which it is installed in the mold half 2.2 according to FIG. 7.

According to these FIGS. 6 and 7, the magazine 5 comprises a carrier plate 5.2 having an insert receiving surface 5.1 on which the inserts 11 are placed. This insert receiving surface 5.1 provides a placement position 5.11 for each insert 11, each of which positions has a placement contour 5.12 adapted to the outer contour of the insert 11, such that the inserts 11 lie directly adjacent to one another. For this purpose, the insert receiving surface 5.1 has a surface structure having wave troughs and wave crests, a wave trough being contour-adapted to an insert 11 as a placement contour 5.12 of a placement position 5.11, i.e., part of the lateral surface of the insert 11 lies in the depression formed by the wave trough.

The geometry of the wave troughs and the wave crests therebetween is such that the directly adjacent inserts 11 lie side by side and touch one another. The distance a1 between two adjacent placement positions 5.11 thus corresponds to the diameter $2r$ of the inserts 11, as is shown schematically in FIG. 7.

The distance between the mold cavities 3.11, 3.12, and 3.13 is an integer multiple of the diameter $2r$ of an insert 11, as a result of which the insert push rods 4.2 and 4.3 are each exactly aligned with a placement position 5.11 of an insert 11, i.e., with a wave trough as a placement contour 5.12.

The wave troughs as placement contours 5.12 are formed by arcuate wave troughs with a radius R1 to produce the undulating surface structure of the insert receiving surface 5.1, and the wave crests likewise have the shape of an arc with a radius R2. So that the depression formed by a wave trough on the insert receiving surface 5.1 does not become too flat, creating the risk of an insert 11 rolling away, the wave crests between the wave troughs must not be too low, and the radius R2 of a wave crest must not be greater than the radius R1 of the wave trough (R2≤R1).

According to FIG. 7, the magazine 5 together with a side wall 2.30 forms a magazine shaft 2.3 when the magazine is installed in the stationary mold half 2.2, such that the inserts 11, proceeding from the loading region 5.13 of the magazine 5, can be pushed over the wave crests of the surface structure of the insert receiving surface 5.1 successively from one placement position 5.11 to the adjacent placement position 5.11.

So that the lift to be overcome by an insert 11 when pushed into the adjacent placement position 5.11 does not become too great, the radius R2 of a wave crest must not be too small either. Therefore, the gradient of the tangent in the transition from a wave trough to a wave crest should be less than 45°. As a result, the pushing force required to push an insert 11 into the adjacent placement position 5.11 should act in the direction of the pushing movement of an insert 11.

Figure 8:
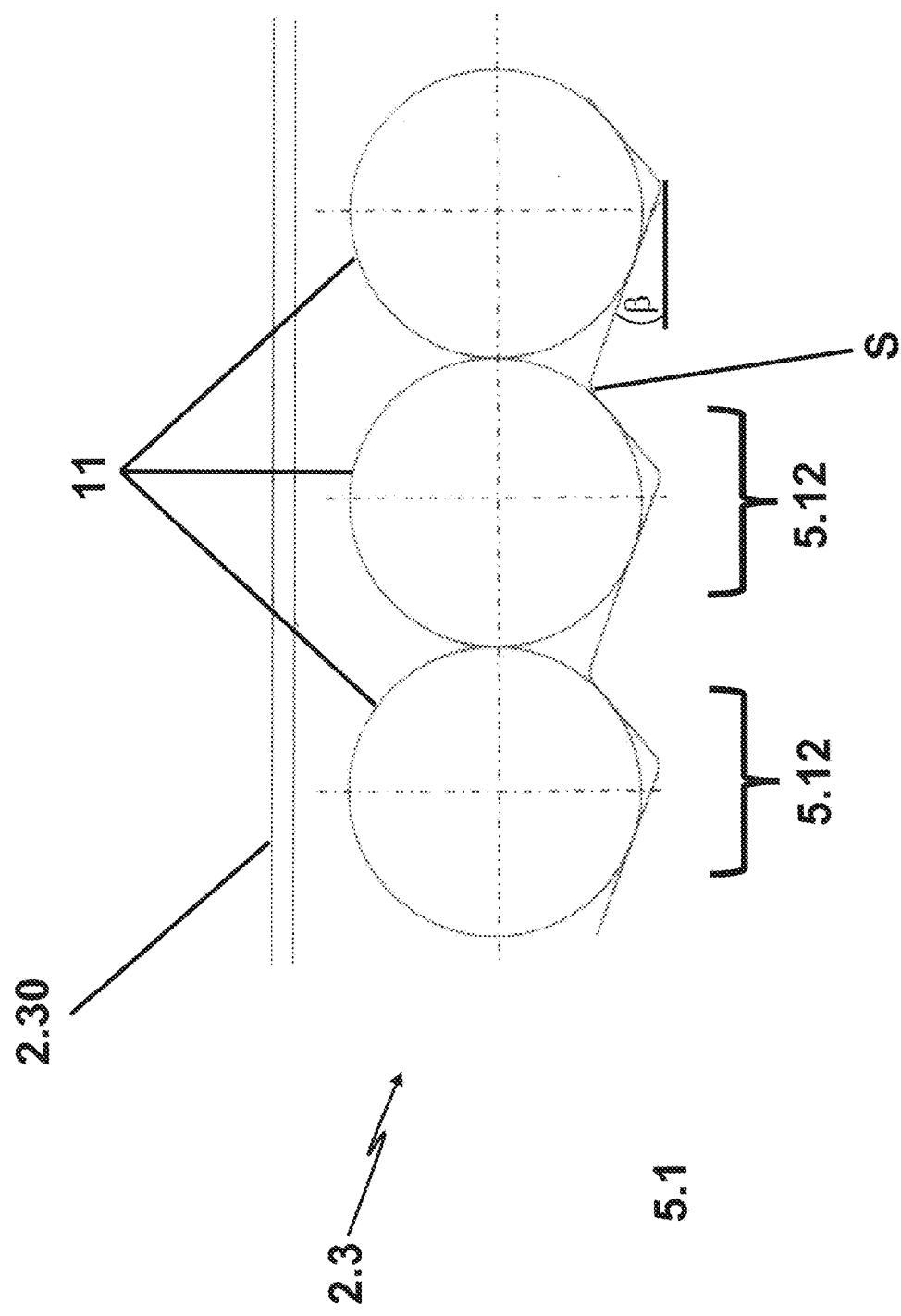
FIG. 8 shows a schematically illustrated insert receiving surface of a magazine having a sawtooth-shaped surface structure.

As an alternative to an undulating surface structure, the insert receiving surface 5.1 according to FIG. 8 can have a sawtooth-shaped surface structure with gently rising and steeply sloping flanks, the inserts 11 each being arranged on the insert receiving surface 5.1 between a steeply sloping flank and a gently rising flank as a placement contour 5.12 adapted to the contour of the inserts 11. The angle β of the gently rising flank determines the positional stability of an insert 11 and the pushing force and should be between 20° and 30°. The insert 11 should be deep enough in the sawtooth contour to prevent it from rolling away, even if the movement of the mold causes vibrations. The apex S of the sawtooth of the sawtooth-shaped surface structure of the insert receiving surface 5.1 is rounded in order to avoid wear of the insert receiving surface 5.1.

The loading of the magazine 5 with inserts 11 is also explained below as part of the description of the production of a molded part 10.

FIG. 1 shows a state of the device 1 having an open mold 1, in which previously an injection-molded part 10 (not shown in FIG. 1) was removed from the mold cavities 3.11, 3.12, 3.13, 3.21, 3.22, and 3.23 by the removal robot 9.1.

According to FIG. 1, no inserts 11 are placed in the placement positions 5.11, which are aligned with the insert feed channels 7, 7.1, and 7.2. These placement positions 5.11 are shown in black in FIG. 1 for the purpose of identification. Three inserfs 11 are placed in the loading region 5.13.

In the subsequent manufacturing step or in the subsequent process stage, the inserts 11 are pushed out of the loading region 5.13 into the magazine shaft 2.3 by means of a pushing device 8.1 for the magazine 5, such that the placement positions 5.11 which are empty according to FIG. 1 and aligned with the insert push rods 4.1, 4.2, and 4.3 are occupied by inserts 11. The same applies to the magazine 6. The inserts 11 placed there are pushed out of the loading region of the magazine 6 into the corresponding magazine shaft by means of a further pushing device 8.2.

The two pushing devices 8.1 and 8.2 each have a longitudinal actuator 8.11 and 8.21, respectively, and a transverse actuator 8.12 and 8.22, respectively.

The two transverse actuators 8.12 and 8.22 move the longitudinal actuators 8.21 and 8.22, respectively, in the y direction, i.e., in the direction of the insert push rods 4.1, 4.2, and 4.3, such that the two longitudinal actuators 8.11 and 8.21 each have a magazine 5 and 6, respectively, i.e., are directed transversely to the insert feed channels 7, 7.1, and 7.2.

Figure 2:
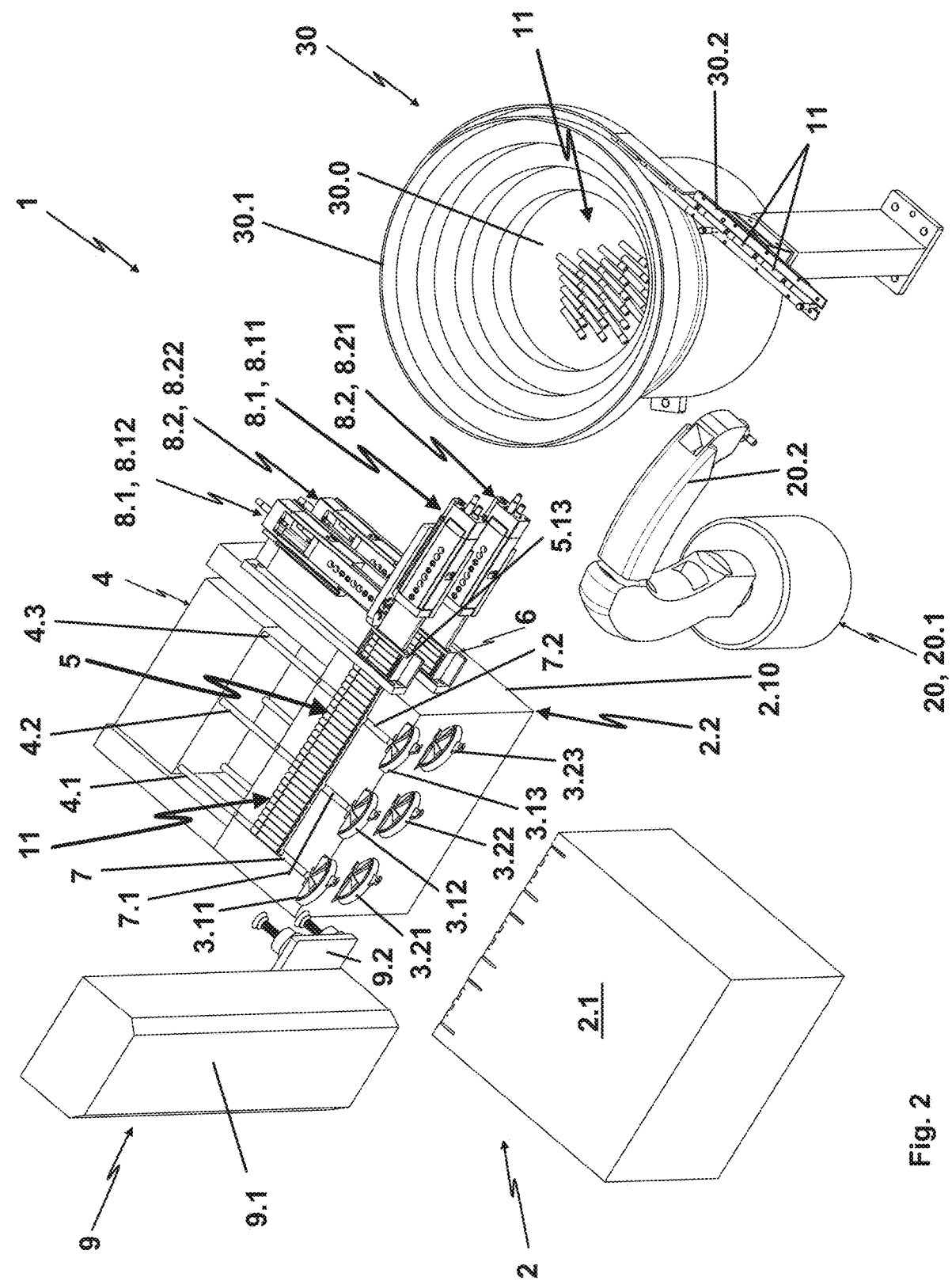
Figure 3:
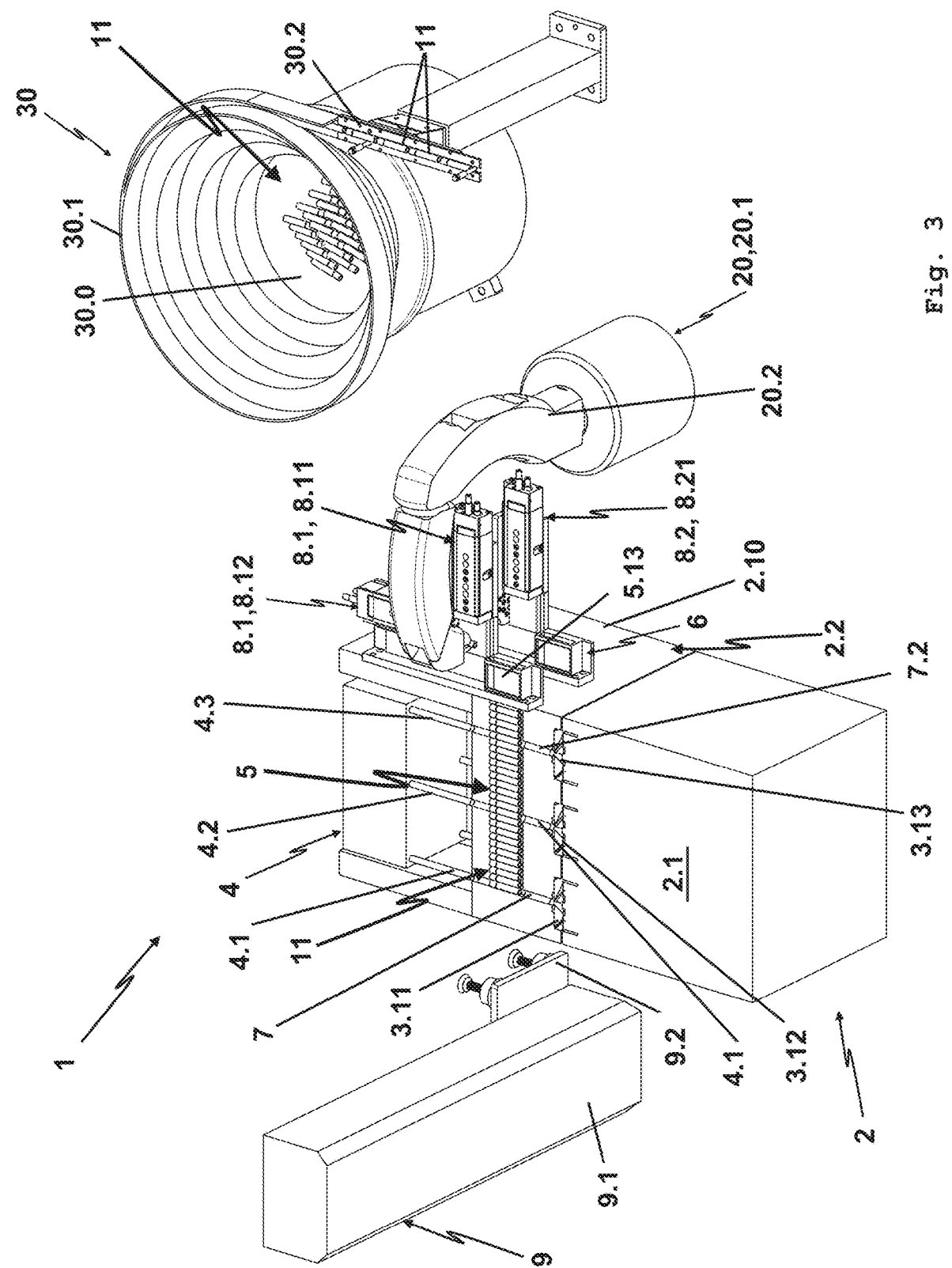

The longitudinal actuator 8.11 exerts frictional pressure on the edge side, i.e., on the last inserted insert 11, toward the adjacent insert 11, so that the respectively following insert 11 is successively pushed into the adjacent placement position 5.11 until the placement positions 5.11 aligned with the insert push rods 4.1, 4.2, and 4.3 are each occupied by an insert 11. The same also applies to the longitudinal actuator 8.21. This means that there are no inserts 11 in the loading region 5.13 of the magazine 5 or in the corresponding loading region of the further magazine 6. FIG. 2 shows this state of the mold 2.

The further pushing of the inserts 11 by means of the longitudinal actuator 8.11 is accomplished by a corresponding dimensioning of the magazine shaft 2.3 and the undulating surface structure of the insert receiving surface 5.1 of the magazine 5 and, in a corresponding manner, of the further magazine 6.

For this purpose, according to FIG. 7, the distance a2 between a wave crest of a placement position 5.11 and the side wall 2.30 limiting the height in the z-direction of the magazine shaft 2.3 is adapted to the diameter 2r of the circular area of the cylindrical insert 11 in such a way that an insert 11 can be pushed over the wave crest into the adjacent placement position 5.11. The distance a2 is only slightly larger, i.e., only a few ¹⁄₁₀ mm, i.e., in particular ³⁄₁₀ mm to ⁵⁄₁₀ mm, larger than the diameter 2r of the insert 11.

With the placement positions 5.11 again loaded with inserts 11, the mold 2 is closed (cf. FIG. 3) and the injection molding process is started and at the same time a robot arm 20.2 of the feeding robot 20.1 removes an insert 11 for the magazine 5 and an insert 11 for the further magazine 6 from a collection plate 30.10 of a spiral conveyor 30.1 of the conveyor device 30 and places them into the loading region 5.13 of the magazine 5 and the corresponding loading region of the further magazine 6, respectively, and this is repeated until the loading regions of the two magazines 5 and 6 are fully loaded. The pushing devices 8.1 and 8.2 are activated beforehand, such that the two transverse actuators 8.12 and 8.22 move the two longitudinal actuators 8.11 and 8.21 in the y direction, specifically in the opposite direction to the mold half 2.2 of the mold 2, and as a result the loading region 5.13 of the magazine 5 and the corresponding loading region of the further magazine 6 are freely accessible to the feeding robot 20.1.

To check whether the two magazines 5 and 6 are fully loaded with inserts 11, only a single sensor is required, which monitors the last placement position 5.11 on the insert receiving surface 5.1. This last placement position 5.11 is at the opposite end of the magazine 5 with respect to the loading region 5.13. The same applies to the further magazine 6. As soon as such a sensor detects an insert 11 at the last placement position 5.11, all placement positions 5.11 in the two magazines 5 and 6 are necessarily equipped with inserts 11.

The inserts 11 are fed to the conveyor device 30 via a linear feeder 30.2 to the spiral conveyor 30.1.

According to FIG. 4, the insert loading device 4 is moved toward the mold half 2.2, as a result of which the insert push rods 4.1, 4.2, and 4.3 and the corresponding insert push rods for the mold cavities 3.21, 3.22, and 3.23 extend into the associated insert feed channels 7, 7.1, and 7.2 and into the insert feed channels provided for the mold cavities 3.21, 3.22, and 3.23 and as a result the inserts 11 are pushed out of the placement positions aligned with the corresponding insert push rods into the mold cavities 3.11, 3.12, 3.13, 3.21, 3.22, and 3.23. This state of the mold 2 is also shown in FIG. 4.

When the injection molding process is complete, the injection-molded parts 10 are ejected by means of the insert device 4 together with the insert push rods 4.1, 4.2, and 4.3 and the corresponding insert push rods for the mold cavities 3.21, 3.22, and 3.23. For this purpose, the insert loading device 4 is designed as an ejector device with the insert push rods 4.1, 4.2, and 4.3 and the corresponding insert push rods for the mold cavities 3.21, 3.22, and 3.23 as ejectors.

According to FIG. 4, the insert push rods 4.1, 4.2, and 4.3 and the corresponding insert push rods for the mold cavities 3.21, 3.22, and 3.23 are designed in such a way that, to insert the inserts 11 into the mold cavities 3.11, 3.12, 3.13, 3.21, 3.22, and 3.23, the insert loading device 4 does not travel fully up to the mold half 2.2 (not shown in FIG. 4); rather, a distance remains between the insert device 4 and the mold half 2.2. These intermediate positions are defined by pushback pins (not shown in the figures), which are supported on the stationary mold half 2.2 when the mold 2 is closed. As a result, the position of the insert device 4 is limited. To eject the molded parts 10 when the mold 2 is open, the insert device 4 travels fully up to the mold half 2.2, overcoming the above-mentioned distance, as a result of which the insert push rods 4.1, 4.2, and 4.3 and the corresponding insert push rods for the mold cavities 3.21, 3.22, and 3.23 eject the molded parts 10 onto a conveyor belt, for example.

The insert device 4 is then moved in the opposite direction to the mold half 2.2, whereby the insert push rods 4.1, 4.2, and 4.3 are extracted from the insert feed channels 7, 7.1, and 7.2 (as well as the corresponding insert push rods for the mold cavities 3.21, 3.22, and 3.23) and thus the placement positions 5.11 aligned with said insert push rods are empty, i.e., without inserts 11. These free placement positions 5.11 are marked in black in FIG. 5 for the purpose of identification.

If the ejector path of the insert push rods 4.1, 4.2, and 4.3 and the corresponding insert push rods for the mold cavities 3.21, 3.22, and 3.2 is shortened, the molded parts 10 are not ejected onto a conveyor belt, but are removed from the mold cavities 3.11, 3.12, 3.13, 3.21, 3.22, and 3.23 by means of the removal robot 9.1. For this purpose, the removal robot 9.1 has a removal adapter 9.2 by means of which the six molded parts 10 are removed from the mold half 2.2 at the same time.

LIST OF REFERENCE SIGNS

1 Device for injection molding
2 Mold
2.1 Mold half of the mold 2
2.10 Side wall of the mold half 2.1
2.2 Mold half of the mold 2
2.3 Magazine shaft of the mold half 2.1
2.30 Side wall of the mold half 2.1 limiting the magazine shaft 2.3
3.11 Mold cavity in the mold 2
3.12 Further mold cavity 3.13 Further mold cavity
3.21 Further mold cavity
3.22 Further mold cavity
3.23 Further mold cavity
4 Insert loading device
4.1 Insert push rod of the insert loading device 4
4.2 Insert push rod of the insert loading device 4
4.3 Insert push rod of the insert loading device 4
5 Magazine
5.1 Insert receiving surface
5.11 Placement position of the insert receiving surface 5.1
5.12 Placement contour of the placement position 5.11
5.13 Loading region of the magazine 5
5.2 Carrier plate of the magazine 5
6 Further magazine
7 Insert feed channel
7.1 Further insert feed channel
7.2 Further insert feed channel
8.1 Pushing device
8.11 Longitudinal actuator of the pushing device 8.1
8.12 Transverse actuator of the pushing device 8.1
8.2 Further pushing device
8.21 Longitudinal actuator of the further pushing device 8.2
8.22 Transverse actuator of the further pushing device 8.2
9 Removal means
9.1 Removal robot
9.2 Removal adapter
10 Molded part
11 Insert of the molded part 10
20 Handling tool
20.1 Feeding robot
20.2 Robot arm of the feeding robot 20.1
30 Conveyor device
30.1 Spiral conveyor of the conveyor device 30
30.10 Collection plate of the spiral conveyor 30.1
30.2 Linear feeder of the conveyor device
a1 Distance
a2 Distance
a3 Distance
R1 Radius of a wave trough
R2 Radius of a wave crest
r Radius of the insert 11
S Apex of the sawtooth contour of the insert receiving surface 5.1
β Angle of the gently rising flank of the sawtooth contour

The invention claimed is:

1. A device (1) for injection molding a molded part (10) having an insert (11), comprising:
a mold (2) having two mold halves (2.1, 2.2) and having at least one mold cavity (3.1),
an insert loading device (4) having at least one insert push rod (4.1) for positioning an insert (11) in the at least one mold cavity (3.11),
at least one magazine (5) having inserts (11) arranged side by side in a row, one insert (11) being aligned with the at least one insert push rod (4.1), and
an insert feed channel (7) ending in the at least one mold cavity (3.11) and into which the insert (11) aligned with the at least one insert push rod (4.1) can be pushed out of the at least one magazine (5) by means of the insert push rod (4.1),
characterized in that
the magazine (5) has a horizontally aligned insert receiving surface (5.1) having adjacent placement positions (5.11) for the inserts (11), the placement positions (5.11) having a placement contour (5.12) adapted to the contour of the inserts (11),
the magazine (5.1) has a loading region (5.13) having at least one freely accessible placement position (5.11) for mechanically loading the same with an insert (11), and
in order to position an insert (11) in the placement position (5.11) aligned with the insert push rod (4.1), the at least one insert (11) placed in the loading region (5.13) can be moved toward an adjacent insert (11) by means of a pushing device (8.1), it being possible for each of the inserts (11) on the insert receiving surface (5.1) to be pushed successively into the adjacent placement position (5.11).

2. The device (1) according to claim 1,
characterized in that
the distance (a1) between adjacent placement positions (5.11) is such that the inserts (11) placed in said adjacent placement positions (5.11) are in abutment.

3. The device (1) according to claim 1,
characterized in that
the magazine (5) is arranged in the stationary molded part (2.2),
the insert receiving surface (5.1) of the magazine (5) forms a magazine shaft (2.3) together with a partition (2.30) of the stationary molded part (2.2), and
the smallest distance between the insert receiving surface (5.1) and the partition (2.30) is 3/10 mm to 5/10 mm, larger than the extent of the insert (11) perpendicular to the partition (2.30).

4. The device (1) according to claim 1,
characterized in that
the insert receiving surface (5.1) has an undulating surface structure of wave troughs and wave crests, the wave troughs being adapted to the contour of the inserts (11) as a placement contour (5.12).

5. The device (1) according to claim 4,
characterized in that
the radius (R2) of a wave crest of the undulating surface structure of the insert receiving surface (5.1) corresponds at most to the radius (R1) of the wave trough.

6. The device (1) according to claim 1,
characterized in that
the insert receiving surface (5.1) has a sawtooth-shaped surface structure with gently rising and steeply sloping flanks, the inserts (11) each being arranged on the insert receiving surface (5.1) between a steeply sloping flank and a gently rising flank as a placement contour (5.12) adapted to the contour of the inserts (11).

7. The device (1) according to claim 6,
characterized in that
the gently rising flank of the sawtooth-shaped surface structure of the insert receiving surface (5.1) is between 20° and 30°.

8. The device (1) according to claim 1,
characterized in that
the mold (2) has at least one further mold cavity (3.12) which is arranged in the plane of the insert receiving surface (5.1) adjacent to the at least one mold cavity (3.11),
the insert loading device (4) has at least one additional insert push rod (4.2) for positioning an insert (11) in the further mold cavity (3.12), and
an insert feed channel (7.1) ending in the further mold cavity (3.12) is provided, into which channel the insert (11) aligned with the further insert push rod (4.2) can be pushed out of the magazine (5) by means of the insert push rod (4.2).

9. The device (1) according to claim 1,
characterized in that
- the mold (2) has at least one further mold cavity (3.21) which is arranged in a plane that is parallel to the plane of the insert receiving surface (5.1) of the at least one magazine (5), and
- in the parallel plane a further magazine (6) according to the preceding claims is arranged in the mold (2).

10. The device (1) according to claim 1,
characterized in that the insert loading device (4) is designed as an ejector device, the insert push rod (4.1, 4.2) being an ejector.

11. The device (1) according to claim 1,
characterized in that a removal means (9) is provided, by means of which an injection-molded part (10) can be removed from the mold (2) when the mold (2) is open.

12. The device (1) according to claim 1,
characterized in that the insert (11) is cylindrical.

* * * * *